G. F. FISHER.
TIRE.
APPLICATION FILED APR. 14, 1916.
1,258,615.
Patented Mar. 5, 1918.
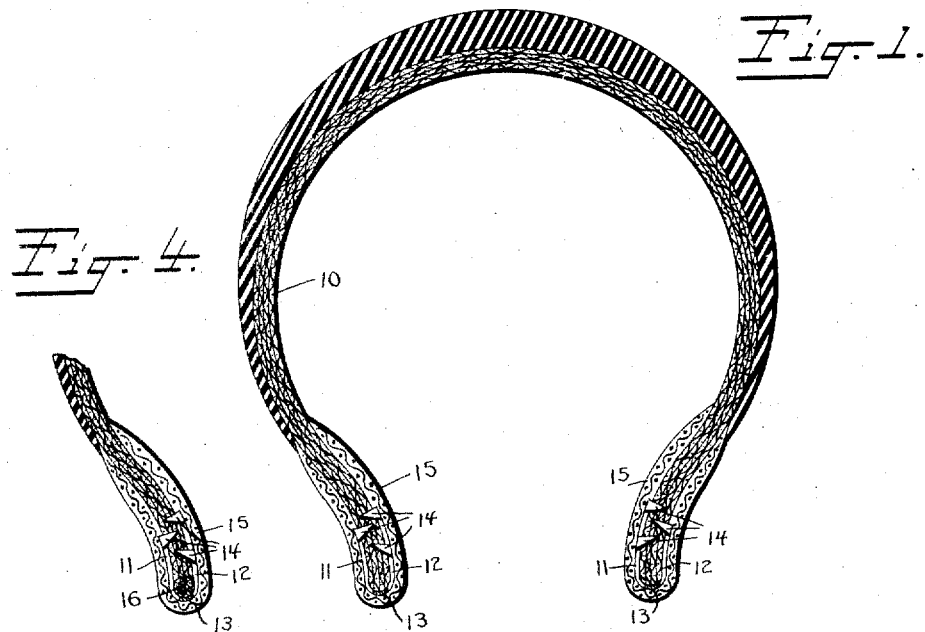
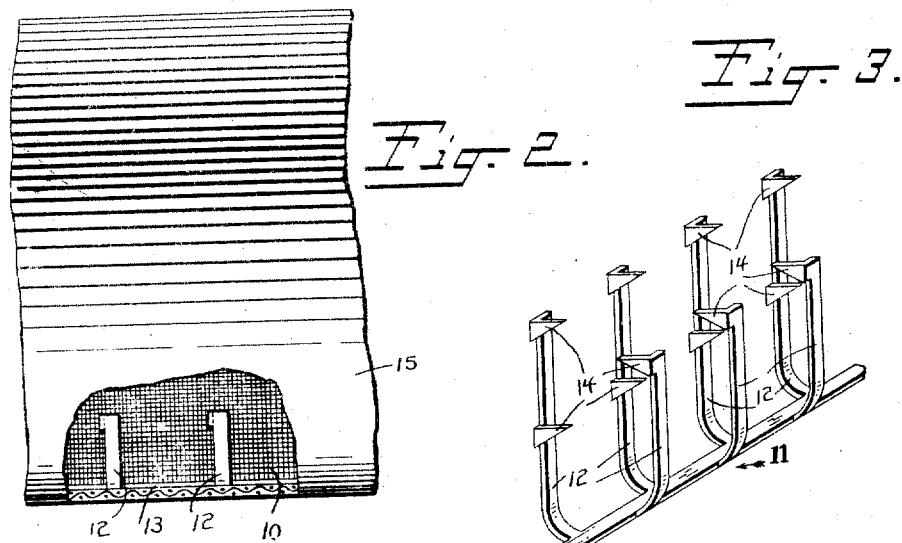
WITNESS:
S. G. Taylor
INVENTOR
George F. Fisher,
BY
Ernest Hopkinson
HIS ATTORNEY

UNITED STATES PATENT OFFICE.

GEORGE F. FISHER, OF ROSELLE, NEW JERSEY, ASSIGNOR TO MORGAN AND WRIGHT, A CORPORATION OF MICHIGAN.

TIRE.

1,258,615.  Specification of Letters Patent.  Patented Mar. 5, 1918.

Application filed April 14, 1916. Serial No. 91,005.

*To all whom it may concern:*

Be it known that I, GEORGE F. FISHER, a citizen of the United States, residing at Roselle, county of Union, and State of New Jersey, have invented certain new and useful Improvements in Tires, of which the following is a full, clear, and exact description.

This invention relates to tires of that general class in which the edges are confined against stretching by inextensible restraining members. Usually tires of this type are completely built upon a sectional core, and after vulcanization of the tire the sections of the core are disassembled and removed from the tire. By the present invention tires of this type are built upon a solid core, thus promoting economy in labor, and in the amount of tire material which enters into the tire.

In carrying out the invention, the tire is built on a solid core to comprise plies of material that pass over the tread of the core and extend approximately to the edges thereof. The tire is then vulcanized, and after vulcanization it is stripped from the core as is done at present with clencher tires. Inextensible restraining members for the edges are now secured outside of the vulcanized plies to complete the formation of the tire.

The invention can be readily understood from the following description taken in connection with the accompanying drawing, in which—

Figure 1 is a cross-sectional view showing a tire embodying my improvements.

Fig. 2 is a fragmentary side elevation of the tire.

Fig. 3 is a detail perspective view of one of the restraining members.

Fig. 4 is a fragmentary sectional view of a modified form of the invention.

In the embodiment of the invention illustrated the tire is built upon a solid, that is, a non-sectional ring core, (not shown) to comprise plies of material 10. All of the plies are of such width that the tire will be slightly larger than ordinarily at its inner diameter, that is, at the edges which come next to the vehicle wheel rim, by an amount equal to the thickness of the inextensible restraining members hereinafter described, so that a saving of tire material is promoted. At this stage the tire is vulcanized, in any preferable manner, as for instance by placing it, supported upon its core, in a mold and subjecting the mold in a vulcanizer to pressure and to heat for a sufficient period to produce the desired degree of vulcanization in the rubber. After vulcanization the mold is removed and the vulcanized tire is stripped from the core in the usual manner.

The restraining members 11 for the edges are now applied. In the present embodiment, each restraining member, as best shown in Fig. 3, comprises a series of staggered elements 12 connected together by a bar 13, the elements being provided with prongs 14. The restraining members are applied astride of respective edges of the tire and the prongs forced to penetrate the plies and firmly secure the members in position. The ends of each restraining member are brought together and are preferably welded or otherwise united to produce an inextensible annulus.

If desired, each restraining member may be left exposed, but I prefer to conceal them by covers 15, preferably of the same material as the plies, and which may be cemented or otherwise secured to the plies.

A modified form of the invention is shown in Fig. 4 wherein each edge portion of the vulcanized tire is reinforced with an endless bead wire 16 composed of a number of convolutions of wire, and disposed outside of the plies to lie along the inner edge thereof. Preferably each bead wire is anchored to the edge of the wire by means of a restraining member such as above described, which is placed astride of the bead wire as shown, and firmly anchors the same in place.

While I have described and illustrated one specific embodiment of the invention, I do not limit myself to the exact construction disclosed, since a wide range of modifications may be resorted to within the scope of the appended claims without departing from the spirit or sacrificing any of the advantages of the invention.

When, in the following claims, I use the phrase "outside of the plies," I mean the term "plies" to include only such plies that pass over the tread of the tire and extend to the edges thereof, and do not mean it to include such component parts of the tire as edge covers or the like which are merely reinforcements.

Having thus described my invention, what

I claim as new and desire to protect by Letters Patent is:

1. A tire embodying a plurality of strips of woven fabric vulcanized together to form plies of the tire with the free ends of the threads composing the strips terminating at the edges of the tire, and a restraining member adjacent said edges exteriorly thereof having ribs projecting therefrom on either side of the tire provided with pointed prongs embedded in the plies for mechanically securing the tire and restraining member together.

2. A tire embodying a plurality of strips of woven fabric vulcanized together to form plies of the tire with the free ends of the threads composing the strips terminating at the edges of the tire, a restraining member adjacent said edges exteriorly thereof, and a fastening device embracing said member and extending up the tire on both sides and provided with pointed prongs embedded in the plies of said tire.

3. A tire embodying a plurality of strips of woven fabric vulcanized together to form plies of the tire with the free ends of the threads composing the strips terminating at the edges of the tire, a restraining member adjacent said edges exteriorly thereof, a fastening device embracing said member and extending up the tire on both sides, and means for securing said device to the tire, said means penetrating said woven plies at a relatively considerable distance above the free ends of the threads.

Signed at New York, N. Y., this 12th day of April, 1916.

GEORGE F. FISHER.